US011967328B2

(12) United States Patent
Ikeshita et al.

(10) Patent No.: US 11,967,328 B2
(45) Date of Patent: Apr. 23, 2024

(54) ESTIMATION DEVICE, ESTIMATION METHOD, AND ESTIMATION PROGRAM

(71) Applicant: NIPPON TELEGRAPH AND TELEPHONE CORPORATION, Tokyo (JP)

(72) Inventors: Rintaro Ikeshita, Musashino (JP); Nobutaka Ito, Musashino (JP); Tomohiro Nakatani, Musashino (JP); Hiroshi Sawada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 168 days.

(21) Appl. No.: 17/629,423

(22) PCT Filed: Aug. 21, 2019

(86) PCT No.: PCT/JP2019/032687
§ 371 (c)(1),
(2) Date: Jan. 24, 2022

(87) PCT Pub. No.: WO2021/033296
PCT Pub. Date: Feb. 25, 2021

(65) Prior Publication Data
US 2022/0301570 A1 Sep. 22, 2022

(51) Int. Cl.
*G10L 19/02* (2013.01)
*G10L 19/008* (2013.01)
*G10L 21/0272* (2013.01)
*G10L 25/18* (2013.01)

(52) U.S. Cl.
CPC ............ *G10L 19/008* (2013.01); *G10L 19/02* (2013.01); *G10L 21/0272* (2013.01); *G10L 25/18* (2013.01)

(58) Field of Classification Search
CPC ...... H04R 25/18; H04R 19/008; H04R 19/02; G10L 19/008; G10L 19/02; G10L 21/0272; G10L 25/18
USPC .......................................... 381/66, 83, 94.7
See application file for complete search history.

(56) References Cited

U.S. PATENT DOCUMENTS 9,788,119 B2 * 10/2017 Vilermo ................ H04R 3/005
10,325,615 B2 * 6/2019 Koretzky ............... G06F 3/165
10,720,174 B2 * 7/2020 Ikeshita ............. G10L 21/0388

OTHER PUBLICATIONS

Kitamura et al., "Determined Blind Source Separation Unifying Independent Vector Analysis and Nonnegative Matrix Factorization", IEEE/ACM Transactions on Audio, Speech, and Language Processing, vol. 24, No. 9, Sep. 2016, pp. 1626-1641.

Ikegita, "Independent Semi-Positive Constant Tensor Analysis for Multi-Channel Sound Source Separation", Lectures by the Acoustical Society of Japan, Mar. 2018, 9 pages including English Translation.

* cited by examiner

*Primary Examiner* — Disler Paul
(74) *Attorney, Agent, or Firm* — XSENSUS LLP

(57) ABSTRACT

A sound source separation filter information estimation device (10) estimates a covariance matrix having information on a correlation between sound source spectra and information on a correlation between channels as information on sound source separation filter information for separating an individual sound source signal from a mixed acoustic signal.

17 Claims, 5 Drawing Sheets

ESTIMATION DEVICE, ESTIMATION METHOD, AND ESTIMATION PROGRAM

CROSS-REFERENCE TO RELATED APPLICATION

The present application is based on PCT filing PCT/JP2019/032687, filed Aug. 21, 2019, the entire contents of which are incorporated herein by reference.

TECHNICAL FIELD

The present invention relates to an estimation device, an estimation method, and an estimation program.

BACKGROUND ART

Known sound source separation methods are independent component analysis (ICA), which is a scheme for performing a sound source separation method based on statistical independence between sound sources, and independent low-rank matrix analysis (ILRMA) provided by combining ICA and nonnegative matrix factorization (NMF), which is a scheme for performing sound source separation based on a low rank of a power spectrum of a sound source (for example, NPL 1).

CITATION LIST

Non Patent Literature

NPL 1: D. Kitamura, N. Ono, H. Sawada, H. Kameoka, and H. Saruwatari, "Determined Blind Source Separation Unifying Independent Vector Analysis and Nonnegative Matrix Factorization", IEEE/ACM Trans. ASLP, vol. 24, no. 9, pp. 1626-1641, 2016.

SUMMARY OF THE INVENTION

Technical Problem

In models of ILRMA and ICA and NMF serving as a basis thereof described in NPL 1, it is assumed that there is no correlation between time frequency bins of sound source spectra. However, because an actual sound source signal often has some correlation between time frequency bins of sound source spectra, a model of the related art seems to be not suitable for modeling an unsteady signal such as vocal sound. In fact, when models of the related art are used, sound source separation sometimes cannot be performed accurately.

The present invention has been made in view of the above, and an object of the present invention is to provide an estimation device, an estimation method, and an estimation program capable of estimating information on sound source separation filter information that enables sound source separation with better performance than in the related art to be realized.

Means for Solving the Problem

In order to solve the above-described problem and achieve the object, an estimation device according to the present invention includes an estimation unit configured to estimate a covariance matrix having information on a correlation between sound source spectra and information on a correlation between channels as information on sound source separation filter information for separating an individual sound source signal from a mixed acoustic signal.

Further, an estimation method according to the present invention includes estimating a covariance matrix having information on a correlation between sound source spectra and information on a correlation between channels as information on sound source separation filter information for separating an individual sound source signal from a mixed acoustic signal.

Further, an estimation program according to the present invention causes a computer to execute estimating a covariance matrix having information on a correlation between sound source spectra and information on a correlation between channels as information on sound source separation filter information for separating an individual sound source signal from a mixed acoustic signal.

Effects of the Invention

According to the present invention, it is possible to estimate the information on sound source separation filter information that enables sound source separation with higher performance than in the related art to be realized.

DESCRIPTION OF EMBODIMENTS

Figure 1:
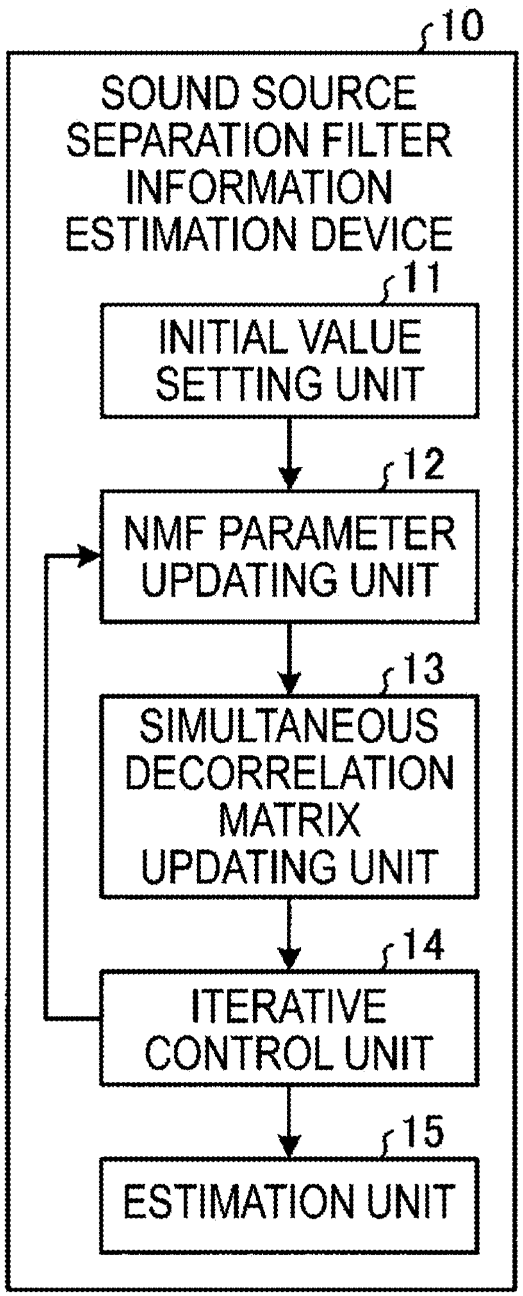
FIG. 1 is a diagram illustrating an example of a configuration of a sound source separation filter information estimation device according to embodiment 1.

Hereinafter, embodiments of an estimation device, an estimation method, and an estimation program according to the present application will be described in detail based on the drawings. The present invention is not limited to the embodiments to be described hereinafter.

Hereinafter, when "^A" is written for A, which is a vector, matrix, or scalar, ^A is assumed to be equivalent to "a symbol in which "^" is written immediately above "A"". When "~A" is written for A, which is a vector, matrix, or scalar, —A is the same as "a symbol in which "~" is written immediately above "A"".

EMBODIMENT

Mathematical Background to Embodiment

The present embodiment proposes a new probabilistic model in which a correlation between sound source spectra has been considered in addition to a correlation between channels. In the present embodiment, sound source separation is performed using a spatial covariance matrix estimated by using the probabilistic model, which enables sound source separation with higher performance than that in the related art. The spatial covariance matrix is information on sound source separation filter information for separating an individual sound source signal from a mixed acoustic signal, and is a parameter for modeling spatial characteristics of each sound source signal. First, a new probabilistic model used in the present embodiment will be described.

Let a mixed acoustic signal, which is an acoustic signal observed by M microphones, be denoted as $x_{f,t} \in \mathbb{C}^M$. In the following equation, "an outlined character C" corresponds to "C". Here, $f \in [F]$ is an index of a frequency bin. $t \in [T]$ is an index of a time frame. $\mathbb{C}^M$ indicates a set of M-dimensional complex vectors. Here, $[I]:=\{1, \ldots, I\}$ (I is an integer). In each time frequency bin, the mixed acoustic signal $x_{f,t} \in \mathbb{C}^M$ is expressed by a sum of microphone observation signals of N sound sources, and is shown by Equation (1).

[Math. 1]

$$x_{f,t}=z_{1,f,t}+\ldots+z_{N,f,t} \in \mathbb{C}^M \tag{1}$$

Let D=FTM, and x and $z_n$, are defined as Expressions (2) and (3) below.

[Math. 2]

$$x:=(x_{f,t} \mid f \in [F], t \in [T]) \in \mathbb{C}^D \tag{2}$$

[Math. 3]

$$z_n:=(z_{n,f,t} \mid f \in [F], t \in [T]) \in \mathbb{C}^D \tag{3}$$

Here, a sound source separation problem dealt with in the present embodiment is formulated as a problem of estimation of an acoustic signal $\{z_n\}_{n=1}^N$ of each sound source from an observed mixed acoustic signal x under the two conditions below (See Equations (4) and (5)).

(Condition 1) Sound source signals are assumed to be independent of each other.

[Math. 4]

$$p(\{z_n\}_{n=1}^N)=\Pi_{n=1}^N p(z_n) \tag{4}$$

(Condition 2) For each $n \in [N]$, it is assumed that $z_n$ follows a complex Gaussian distribution with the following mean 0 and spatial covariance matrix $R_n$.

[Math. 5]

$$p(z_n)=\mathbb{C}N(z_n \mid 0, R_n) \quad (n \in [N]) \tag{5}$$

As the above model shows, when the spatial covariance matrix $R_n$ can be estimated, a signal of each sound source can be estimated using Equations (1), (4), and (5).

Here, ILRMA, which is the related art, is a technology for estimating the spatial covariance matrix $R_n$ on the assumption that there is no correlation between time frequency bins of the sound source spectra, in addition to conditions 1 and 2 above. In ILRMA, estimation is performed on the assumption that $R_n$ satisfies properties shown in Equations (6) to (8) and Relationship (9) below.

[Math. 6]

$$R_n=\oplus_{f=1}^F \oplus_{t=1}^T R_{n,f,t} \in S_+^{FTM} \tag{6}$$

[Math. 7]

$$W_f^H R_{n,f,t} W_f=\lambda_{n,f,t} E_{n,n} \in S_+^M \tag{7}$$

[Math. 8]

$$\lambda_{n,f,t}=\Sigma_{k=1}^K \varphi_{n,f,k} \psi_{n,k,t} \in \mathbb{R}_{\geq} \tag{8}$$

[Math. 9]

$$\varphi_{n,f,k}, \psi_{n,k,t} \in \mathbb{R}_{\geq 0} \tag{9}$$

Here, $S_+^D$ is a set of all semi-fixed Hermitian matrices having a size D×D. $E_{n,n}$ is a matrix in which the (n, n) component is 1 and the others are 0. Further, $\{\lambda_{n,f,t}\}_{f,t} \subseteq R_{\geq 0}$ is a power spectrum of a sound source n, and is obtained by modeling through non-negative matrix factorization (NMF) as shown in Equations (8) and (9). K is the number of bases of NMF. $\{\Phi_{n,f,k}\}_{f=1}^F$ is a k-th base of the sound source n. $\{\Psi_{n,k,t}\}_{t=1}^T$ is an activation for the k-th base of the sound source n.

The present embodiment proposes a model obtained by extending the model ILRMA, which is a method of the related art, so that a correlation between the sound source spectra is considered. Specifically, in the present embodiment, a spatial covariance matrix having information on the correlation between the sound source spectra and information on a correlation between channels is estimated as the information on the sound source separation filter information for separating an individual sound source signal from the mixed acoustic signal. Models in which the correlation between channels and the correlation between the sound source spectra are considered include three patterns including an expression format in which frequency correlation is considered (ILRMA-F), an expression format in which time correlation is considered (ILRMA-T), and an expression format in which both the time correlation and the frequency correlation are considered (ILRMA-FT), and sound source separation can be performed using any of these patterns.

ILRMA-F

First, ILRMA-F, which is a model in which frequency correlation has been considered, will be described. ILRMA-F uses a model in which Equations (10) and (11) below have been assumed instead of Equations (6) and (7) assumed in ILRMA of the related art because correlation between frequency bins is considered.

[Math. 10]

$$R_n=\oplus_{t=1}^T R_{n,t} \in S_+^{FTM} \tag{10}$$

[Math. 11]

$$P^H R_{n,t} P=\oplus_{f=1}^F (\lambda_{n,ft} E_{n,n}) \in S_+^{FM} \tag{11}$$

Here, $P \in GL(FM)$ is a block matrix having a size F×F, which includes a matrix having a size M×M as an element, and a $(f_1, f_2)$-th block thereof is expressed by Expression (12) below.

[Math. 12]

$$\begin{cases} P_{f_2, f_1-f_2} & (\text{if } f_1-f_2 \in \Delta_{f_2}) \\ O & (\text{otherwise}) \end{cases} \tag{12}$$

Here, for each $f \in [F]$, it is assumed that $\Delta_f \subseteq Z$ (Z is a set of all integers) is a set of integers and satisfies $0 \in \Delta_f$. As an example of P satisfying the above properties, P in the case of F=4 and $\Delta_f=\{0,2,3,-1\}$ ($f \in [F]$) is shown in Equation (13) below.

[Math. 13]

$$P = \begin{pmatrix} P_{1,0} & P_{2,-1} & O & O \\ O & P_{2,0} & P_{3,-1} & O \\ P_{1,2} & O & P_{3,0} & P_{4,-1} \\ P_{1,3} & P_{2,2} & O & P_{4,0} \end{pmatrix} \in GL(4M) \tag{13}$$

Thus, P is characterized in that P has one or more non-zero components in non-diagonal blocks, in addition to a diagonal block $P_{f,0}$ (f ∈ [F]). In P, the diagonal blocks indicate the correlation between the channels, and the non-diagonal blocks indicates the correlation between frequency directions. Further, it is possible to reduce a calculation time required for estimation of the spatial covariance matrix by modeling P in which most of the non-diagonal blocks are 0. Further, in ILRMA-F, $\Delta_f \subseteq Z$ is designed so that P satisfies Equation (14), making it possible to greatly reduce the calculation time required for estimation of the spatial covariance matrix.

[Math. 14]

$$\log|\det P| = \prod_{f\in[F]} \log|\det P_{f,0}| \tag{14}$$

ILRMA-T

Next, ILRMA-T which is a model in which time correlation is considered will be described. Because correlation between time frames is considered, ILRMA-T uses a model in which Equations (15) and (16) below are assumed instead of Equations (6) and (7) assumed in ILRMA of the related art.

[Math. 15]

$$R_n = \oplus_{f=1}^{F} R_{n,f} \in S_+^{FTM} \tag{15}$$

[Math. 16]

$$P_f^H R_{n,f} P_f = \oplus_{t=1}^{T} *\lambda_{n,f,t} E_{n,n}) \in S_+^{TM} \tag{16}$$

Here, P ∈ GL (TM) is a block matrix having a size T×T, includes a matrix having a size M×M as an element, and it is assumed that a ($t_1$, $t_2$)-th block thereof is expressed by Expression (17) below.

[Math. 17]

$$\begin{cases} P_{f,t_1-t_2} & (\text{if } t_1 - t_2 \in \Delta_f) \\ O & (\text{otherwise}) \end{cases} \tag{17}$$

Here, for each f ∈ [F], it is assumed that $\Delta_f \subseteq Z$ is a set of integers and satisfies 0 ∈ $\Delta_f$.

ILRMA-FT

Next, ILRMA-FT, which is a model in which both time correlation and frequency correlation have been considered, will be described. ILRMA-FT uses a model in which Equation (18) below has been assumed instead of Equations (6) and (7) assumed in the ILRMA of the related art is used because the correlation between frequency bins and the correlation between time frames are considered.

[Math. 18]

$$P^H R_n P = \oplus_{f=1}^{F} \oplus_{t=1}^{T} (\lambda_{n,f,t} E_{n,n}) \in S_+^{FTM} \tag{18}$$

Here, P ∈ GL (FTM) is a block matrix having a size FT×FT, which includes a matrix having a size M×M as an element, and a $((f_1-1)T+t_1, (f_2-1)T+t_2)$-th block is assumed to be expressed by Expression (19) below.

[Math. 19]

$$\begin{cases} P_{f_2, f_1-f_2, t_1-t_2} & (\text{if } (f_1 - f_2, t_1 - t_2) \in \Delta_{f_2}) \\ O & (\text{otherwise}) \end{cases} \tag{19}$$

Here, it is assumed that, for each f ∈ [F], $\Delta_f \subseteq Z \times Z$ is a set of pairs of integers and satisfies (0,0) ∈ $\Delta_f$. As an example of P satisfying the above properties, P ∈ GL (6M) in the case of F=3, T=2, and $\Delta_f$={(0,0), (0, −1), (−1, ±1), (−2, 0)} (f ∈ [F]) is shown by Expression (20) below.

[Math. 20]

$$\left(\begin{array}{cc|cc|cc} P_{1,0,0} & P_{1,0,-1} & O & P_{2,-1,-1} & P_{3,-2,0} & O \\ O & P_{1,0,0} & P_{2,-1,1} & O & O & P_{3,-2,0} \\ \hline O & O & P_{2,0,0} & P_{2,0,-1} & O & P_{3,-1,-1} \\ O & O & O & P_{2,0,0} & P_{3,-1,1} & O \\ \hline O & O & O & O & P_{3,0,0} & P_{3,0,-1} \\ O & O & O & O & O & P_{3,0,0} \end{array}\right) \tag{20}$$

Thus, P is characterized in that P has one or more non-zero blocks in non-diagonal blocks, in addition to a diagonal blocks $P_{f,0,0}$ (f ∈ [F]). The diagonal blocks express correlation between channels and the non-diagonal blocks express correlation between time-frequency bins. Further, it is possible to reduce the calculation time required for estimation of the spatial covariance matrix by modeling P in which most of the non-diagonal blocks are 0. Further, in ILRMA-FT, it is possible to greatly reduce the calculation time required for estimation of the spatial covariance matrix by designing $\Delta_f \subseteq Z \times Z$ so that P satisfies Equation (21).

[Math. 21]

$$\log|\det P| = \prod_{f\in[F]} \prod_{t\in[T]} \log|\det P_{f,0,0}| \tag{21}$$

Thus, the model proposed in the present embodiment estimates the spatial covariance matrix having the information on the correlation between the sound source spectra and the information on the correlation between the channels as the information on the sound source separation filter information for separating an individual sound source signal from a mixed acoustic signal. In the present embodiment, the spatial covariance matrix is estimated by modeling such that the spatial covariance matrices as may as the sound sources are diagonalizable at the same time. In the present embodiment, the spatial covariance matrix is estimated on the assumption that a matrix after simultaneous diagonalization is modeled according to nonnegative matrix factorization.

Thus, in the present embodiment, it is possible to estimate the spatial covariance matrix in consideration of not only inter-channel correlation of the related art but also sound source spectrum correlation that cannot be considered in the related art by estimating the spatial covariance matrix $It_r$, based on the models ILRMA-F, ILRMA-T, or ILRMA-FT.

EMBODIMENT 1

Sound Source Separation Filter Information Estimation Device

Next, the sound source separation filter information estimation device according to embodiment 1 will be described. Here, the information regarding the sound source separation filter is information for separating an individual sound source signal from the mixed acoustic signal, and is the spatial covariance matrix $R_n$ in the ILRMA-F, ILRMA-T, or ILRMA-FT models described above. Because the ILRMA-FT model includes the ILRMA-F and ILRMA-T models in a special case, the sound source separation filter information estimation device to which the ILRMA-FT model has been applied will be described hereinafter.

FIG. 1 is a diagram illustrating an example of a configuration of the sound source separation filter information estimation device according to embodiment 1. As illustrated in FIG. 1, the sound source separation filter information estimation device 10 (estimation unit) according to embodiment 1 includes an initial value setting unit 11, an NMF parameter updating unit 12, a simultaneous decorrelation matrix updating unit 13, an iterative control unit 14, and an estimation unit 15. The sound source separation filter information estimation device 10 is implemented, for example, by a predetermined program being read into a computer including a read only memory (ROM), a random access memory (RAM), a central processing unit (CPU), and the like, and executed by the CPU.

The initial value setting unit 11 sets $\Delta_f \subseteq Z \times Z$ that determines a non-zero structure of a simultaneous decorrelation matrix P. Here, the initial value setting unit 11 sets $\Delta_f \subseteq Z \times Z$ so that the simultaneous decorrelation matrix P satisfies Equation (22).

[Math. 22]

$$\log|\det P| = \prod_{f\in[F]}\prod_{t\in[T]}\log|\det P_{f,0,0}| \tag{22}$$

Further, in the initial value setting unit 11 sets appropriate initial values for the simultaneous decorrelation matrix P and an NMF parameter $\{(\varphi_{n,f,k}, \Psi_{n,k,t}\}_{n,f,k,t}$ in advance.

The NMF parameter updating unit 12 updates the NMF parameter $\{\varphi_{n,f,k}, \Psi_{n,k,t}\}_{n,f,k,t}$ according to Relationships (23) and (24). Here, as the mixed acoustic signal input to the sound source separation filter information estimation device 10, for example, it is assumed that an acoustic signal obtained by performing short-time Fourier transform on a collected mixed acoustic signal is used.

[Math. 23]

$$\varphi_{n,f,k} \leftarrow \varphi_{n,f,k}\sqrt{\frac{\sum_t |y_{n,f,t}|^2\psi_{n,k,t}\left(\sum_k \varphi_{n,f,k}\psi_{n,k,t}\right)^{-2}}{\sum_t \psi_{n,k,t}\left(\sum_k \varphi_{n,f,k}\psi_{n,k,t}\right)^{-1}}} \tag{23}$$

[Math. 24]

$$\psi_{n,f,t} \leftarrow \psi_{n,f,t}\sqrt{\frac{\sum_f |y_{n,f,t}|^2\varphi_{n,f,k}\left(\sum_k \varphi_{n,f,k}\psi_{n,k,t}\right)^{-2}}{\sum_f \varphi_{n,f,k}\left(\sum_k \varphi_{n,f,k}\psi_{n,k,t}\right)^{-1}}} \tag{24}$$

Here, $y_{n,f,t}$ is Expression (25).

[Math. 25]

$$y_{n,f,t} := e_d^T P^H x \in \mathbb{C} \tag{25}$$

However, d:=fTM+tM+n. $e_d$ is a vector in which a d-th element is 1 and the others are 0. The superscript T indicates the transpose of a matrix or vector. The superscript H indicates the Hermitian transpose of a matrix or vector. Further, x is a symbol indicating the input mixed acoustic signal.

The NMF parameter updating unit 12 uses the updated parameter $\{\varphi_{n,f,k}, \Psi_{n,k,t}\}_{n,f,k,t}$ to update the value of $\lambda_{n,f,t}$ according to Equation (8). $\lambda_{n,f,t}$ can be regarded as analogs of the power spectrum.

The simultaneous decorrelation matrix updating unit 13 updates a matrix (a simultaneous decorrelation matrix) P that simultaneously decorrelates the inter-channel correlation and the sound source spectrum correlation from the input mixed acoustic signal according to the following procedure A or B.

Procedure A

The simultaneous decorrelation matrix updating unit 13 updates $\hat{p}_{n,f}$ for each n according to Equations (26) and (27).

[Math. 26]

$$\hat{a}_n = (((P_{0,0}{}^H)^{-1}e_n)^T, 0_{N(|\Delta|-1)})^T \in \mathbb{C}^{N|\Delta|} \tag{26}$$

[Math. 27]

$$\hat{p}_n = \hat{G}_n{}^{-1}\hat{a}_n(\hat{a}_n{}^H\hat{G}_n{}^{-1}\hat{a}_n)^{-1/2}e\sqrt{-10}(\theta \in \mathbb{R}) \tag{27}$$

Here, $\hat{x}_{f,t}$, $\hat{P}_f$, $\hat{p}_{n,f}$, and $\hat{G}_{n,f}$ are as Expressions (28) to (31) below.

[Math. 28]

$$\hat{x}_{f,t} := \left(x_{f+\delta_1,t+\delta_2} \,\middle|\, (\delta_1,\delta_2) \in \Delta_f\right) \in \mathbb{C}^{N|\Delta_f|} \tag{28}$$

[Math. 29]

$$\hat{P}_f := \left(P_{f,\delta_1,\delta_2} \,\middle|\, (\delta_1,\delta_2) \in \Delta_f\right) \in \mathbb{C}^{N|\Delta_f| \times N} \tag{29}$$

[Math. 30]

$$\hat{p}_{n,f} := \hat{P}_f e_n \in \mathbb{C}^{N|\Delta_f|}(n \in [N]) \tag{28}$$

[Math. 31]

$$\hat{G}_{n,f} := \frac{1}{T}\sum_{t\in[T]}\frac{\hat{x}_{f,t}\hat{x}_{f,t}^H}{\lambda_{n,f,t}} \in S_+^{N|\Delta_f|} \tag{31}$$

However, in Equations (26) and (27), the frequency bin index f ∈ [F] is omitted. Further, as shown in Expression (30), because $\hat{p}_{n,f}$ is information for specifying the simultaneous decorrelation matrix AP, it can be said that updating $\hat{p}_{n,f}$ and updating $\hat{P}$ are synonymous.

Procedure B

Procedure B is a scheme that can be applied only when the number of sound sources N=2. In step B, the simultaneous decorrelation matrix updating unit 13 updates $\hat{P}_f$ according to Equations (32) to (34).

[Math. 32]

$$V_1u_1=\lambda_1V_2u_1,\ V_1u_2=\lambda_2V_2u_2,\ \lambda_1>\lambda_2 \tag{32}$$

[Math. 33]

$$a_n=u_n\left(u_n^HV_nu_n\right)^{-1/2}\in\mathbb{C}^2 \tag{33}$$

[Math. 34]

$$\hat{p}_n=\hat{G}_n^{-1}\begin{pmatrix}a_n\\0_L\end{pmatrix}e^{\sqrt{-1}\theta_n}\in\mathbb{C}^{2|\Delta|}(\theta_n\in\mathbb{R}) \tag{34}$$

Here, $V_n$ indicates a 2×2 principal minor matrix in the upper left of $\hat{G}_n^{-1}$ (a matrix corresponding to the first 2-by-2 matrix). Further, u1 and u2 are eigenvectors of a generalized eigenvalue problem $V_1u=\lambda,V_2u$. Further, in Equations (32) to (34), the index f ∈ [F] of the frequency bin is omitted.

The simultaneous decorrelation matrix updating unit 13 may use a result of adding εI based on a small ε>0 to $\hat{G}_{n,f}$ shown in Expression (31), as $\hat{G}_{n,f}$ in order to achieve numerical stability in executing procedure A or procedure B.

The iterative control unit 14 alternately and interactively executes the processing of the NMF parameter updating unit 12 and the processing of the simultaneous decorrelation matrix updating unit 13 until a predetermined condition is satisfied. The iterative control unit 14 ends the iterative processing when the predetermined condition is satisfied. The predetermined condition is, for example, that a predetermined number of iterations is reached, that an amount of updating of the NMF parameter and the simultaneous decorrelation matrix is equal to or smaller than a predetermined threshold value, or the like.

The estimation unit 15 applies a parameter P and $\lambda_{n,f,t}$ at the time of ending of the processing of the NMF parameter updating unit 12 and the processing of the simultaneous decorrelation matrix updating unit 13 to Equation (18) to estimate the spatial covariance matrix $R_n$. The estimation unit 15 outputs the estimated spatial covariance matrix $R_n$ to, for example, the sound source separation device.

When the ILRMA-F model is applied, the estimation unit 15 applies the parameter P and $\lambda_{n,f,t}$ at the time of ending of the processing of the NMF parameter updating unit 12 and the processing of the simultaneous decorrelation matrix updating unit 13 to Equations (10) and (11) to estimate the spatial covariance matrix $R_n$. Further, when the ILRMA-T model is applied, the estimation unit 15 applies the parameter P and $\lambda_{n,f,t}$ at the time of the ending of the processing of the NMF parameter updating unit 12 and the processing of the simultaneous decorrelation matrix updating unit 13 to Equations (15) and (16) to estimate the spatial covariance matrix $R_n$.

Processing Procedure for Estimation Process

Figure 2:
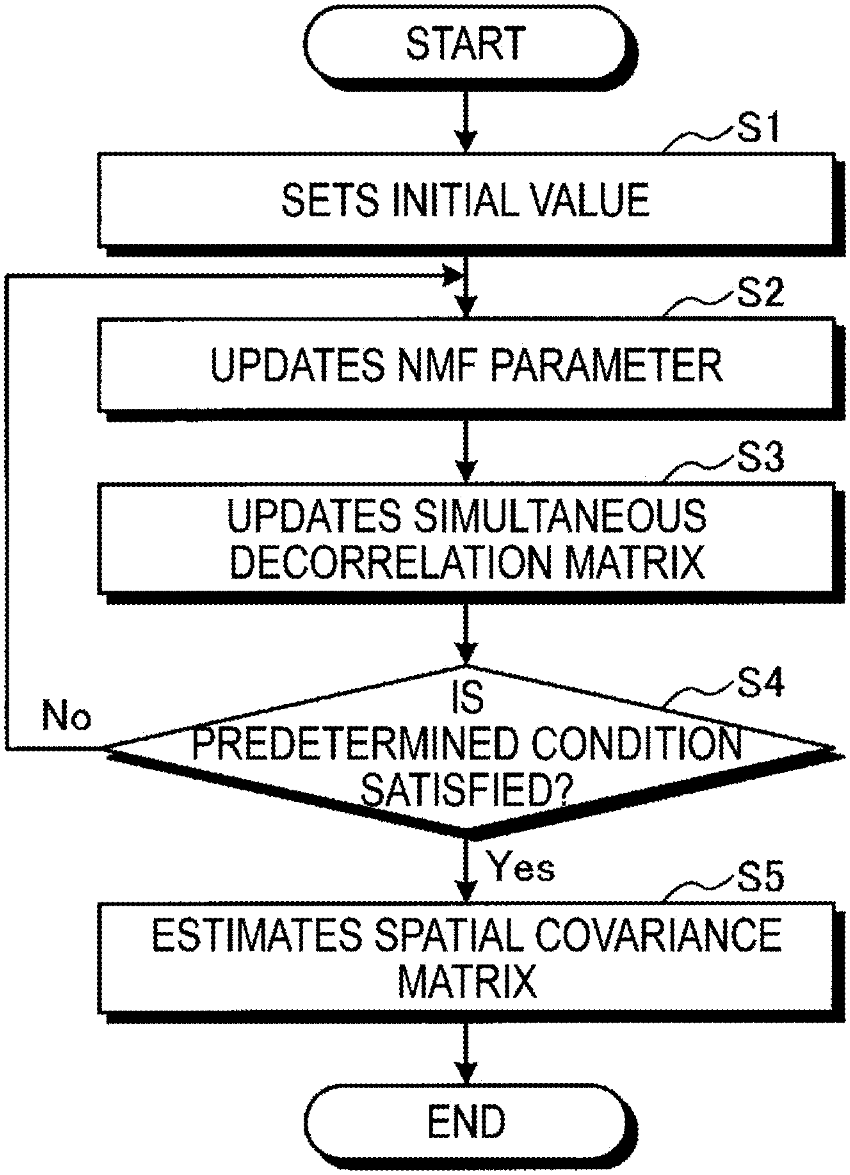
FIG. 2 is a flowchart illustrating a processing procedure of estimation processing according to embodiment 1.

Next, estimation processing for estimating the information on the sound source separation filter information that is executed by the sound source separation filter information estimation device 10 of FIG. 1 will be described. FIG. 2 is a flowchart illustrating a processing procedure for the estimation processing according to embodiment 1.

As illustrated in FIG. 2, in the sound source separation filter information estimation device 10, when an input of the mixed acoustic signal is received, the initial value setting unit 11 sets $\Delta_f \subseteq Z\times Z$ that determines the non-zero structure of the simultaneous decorrelation matrix P, and sets the initial values for the simultaneous decorrelation matrix P and the NMF parameter $\{\varphi_{n,f,k}, \Psi_{n,k,t}\}_{n,f,k,t}$ (step S1).

The NMF parameter updating unit 12 updates the NMF parameter $\{\varphi_{n,f,k}, \Psi_{n,k,t}\}_{n,f,k,t}$ according to Expressions (23) and (24), and uses the updated parameter $\{\varphi_{n,f,k}, \Psi_{n,k,t}\}_{n,f,k,t}$ and Equation (8) to update the value of $\lambda_{n,f,t}$ (step S2). The simultaneous decorrelation matrix updating unit 13 updates the simultaneous decorrelation matrix P from the input mixed acoustic signal according to procedure A or B below (step S3).

The iterative control unit 14 determines whether or not the predetermined condition is satisfied (step S4). When the predetermined condition is not satisfied (step S4: No), the iterative control unit 14 returns to step S2 and causes the processing of the NMF parameter updating unit 12 and the processing of the simultaneous decorrelation matrix updating unit 13 to be executed.

When the predetermined condition is satisfied (step S4: Yes), the estimation unit 15 applies the parameter P and $\lambda_{n,f,t}$ at the time of the ending of the processing of the NMF parameter updating unit 12 and the processing of the simultaneous decorrelation matrix updating unit 13, to the ILRMA-F, ILRMA-T, or ILRMA-T model to estimate the spatial covariance matrix $R_n$ (step S5).

Effects of Embodiment 1

Thus, the sound source separation filter information estimation device 10 according to embodiment 1 estimates the spatial covariance matrix by modeling such that the spatial covariance matrices including information on the correlation between the sound source spectra and information on the correlation between channels as the information on the sound source separation filter information for separating an individual sound source signal from the mixed acoustic signal are diagonalizable at the same time. In other words, the sound source separation filter information estimation device 10 estimates the spatial covariance matrix including the information on the correlation between the sound source spectra and the information on the correlation between channels, unlike the model of the related art in which time-frequency bins of a sound source spectrum are assumed to be uncorrelated. Thus, according to the sound source separation filter information estimation device 10, because a spatial covariance matrix that is more compatible with an actual sound source signal that often has a correlation between the time frequency bins of the sound source spectra is used as the information on the sound source separation filter information, it is possible to realize sound source separation with higher performance than in a model of the related art.

EMBODIMENT 2

Figure 3:
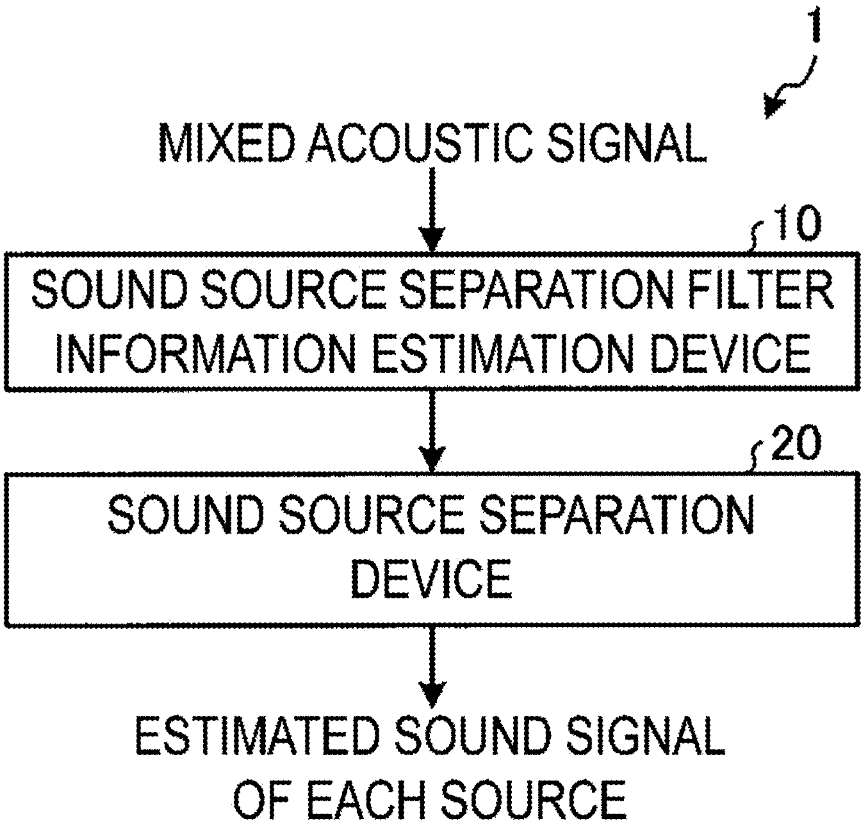
FIG. 3 is a diagram illustrating an example of a configuration of a sound source separation system according to embodiment 2.

Next, embodiment 2 will be described. FIG. 3 is a diagram illustrating an example of a configuration of a sound source separation system according to embodiment 2. As illustrated in FIG. 3, the sound source separation system 1 according to embodiment 2 includes the sound source separation filter information estimation device 10 illustrated in FIG. 1 and a sound source separation device 20 (a sound source separation unit).

The sound source separation device 20 is implemented by, for example, a predetermined program being read into a computer including a ROM, RAM, CPU, and the like and executed by the CPU. The sound source separation device 20 separates each sound source signal from the mixed acoustic signal by using the spatial covariance matrix estimated by the sound source separation filter information estimation device 10.

Specifically, the sound source separation device 20 uses the spatial covariance matrix Rn output from the sound source separation filter information estimation device 10 to acquire an estimation result $\sim z_n$ of each sound source signal according to Equation (35) and output the estimation result $\sim z_n$.

[Math. 35]

$$\tilde{z}_n = \mathbb{E}[z_n|x] = R_n(\Sigma_{n=1}^{N} R_n)^{-1} x \in \mathbb{C}^D \tag{35}$$

Alternatively, the sound source separation device 20 uses the simultaneous decorrelation matrix P obtained by the sound source separation filter information estimation device 10 instead of the spatial covariance matrix $R_n$ to acquire the estimation result $\sim z_n$ of each sound source signal according to Equation (36), and outputs the estimation result $z_n$.

[Math. 36]

$$\tilde{z}_n = (Q^H)^{-1}(\oplus_{f=1}^{F} \oplus_{t=1}^{T} E_{n,n}) P^H x \tag{36}$$

Here, Q corresponds to a matrix in which $(\delta_F, \delta_T) \in \Delta_f$, $\delta_F = 0$, and $\delta_T < 0$ are satisfied in P defined by Expression (19), and replacement with Equation (37) has been performed.

[Math. 37]

$$P_{f,\delta_F,\delta_T} = O \tag{37}$$

Processing Procedure for Sound Source Separation Processing

Figure 4:
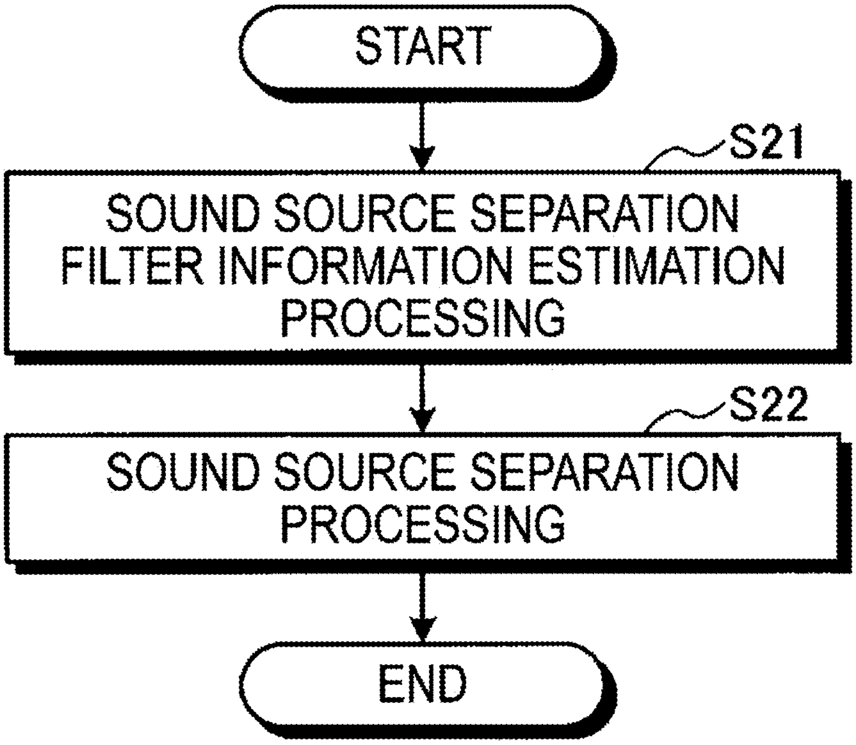
FIG. 4 is a flowchart illustrating a processing procedure of the sound source separation processing according to embodiment 2.

Next, sound source separation processing that is executed by the sound source separation system 1 of FIG. 3 will be described. FIG. 4 is a flowchart illustrating a processing procedure of the sound source separation processing according to embodiment 2.

As illustrated in FIG. 4, the sound source separation filter information estimation device 10 performs a sound source separation filter information estimation processing (step S21). The sound source separation filter information estimation device 10 performs processes of steps S1 to S5 illustrated in FIG. 2 as sound source separation information estimation processing to estimate the spatial covariance matrix which is the information on the sound source separation filter information.

The sound source separation device 20 performs the sound source separation processing for separating an individual sound source signal from the mixed acoustic signal using the spatial covariance matrix estimated by the sound source separation filter information estimation device 10 (step S22).

Effects of Embodiment 2

Thus, the sound source separation system 1 according to embodiment 2 uses the spatial covariance matrix including the information on the correlation between the sound source spectra and the information on the correlation between channels to perform sound source separation, thereby realizing sound source separation with a higher accuracy than in the related art.

Evaluation Experiment

An evaluation experiment was conducted to evaluate the separation performance of the ILRMA model of the related art and the ILRMA-F model, ILRMA-T model, or ILRMA-FT model proposed in the present embodiment. In this evaluation experiment, a mixed signal which was created using two microphones and two sound sources from live sound recording data of a data set provided by SiSEC2008 as evaluation data, and separation accuracies were compared. A frame length of 128 ms and 256 ms was used. Results of this evaluation experiment are shown in Table 1.

TABLE 1

Source separation performance in terms of SDR [dB]

| | Frame length | 128 ms | | 256 ms | |
|---|---|---|---|---|---|
| Method | $\Delta_f \backslash \{(0, 0)\}$ | IP-1 | IP-2 | IP-1 | IP-2 |
| ILRMA | ∅ | 6.0 | 6.5 | 7.6 | 8.6 |
| ILRMA-F | {(−2, 0), (−8, 0)} | 6.8 | 6.8 | 8.1 | 9.4 |
| ILRMA-T | {(0, −2)} | 8.1 | 8.3 | (8.0) | (8.3) |
| ILRMA-FT | {(−2, 0), (−8, 0), (0, −2)} | 8.6 | 8.7 | (7.2) | (9.0) |

As shown in Table 1, irrespective of the ILRMA-F, ILRMA-T, and ILRMA-FT models used, results showing higher separation accuracy than in the ILRMA model of the related art were obtained.

System Configuration or the Like

Each component of each of the illustrated devices is a functional concept, and is not necessarily physically configured as illustrated in the figures. That is, a specific form of distribution and integration of the respective devices is not limited to the one illustrated in the figure, and all or some of the devices can be configured to be functionally or physically distributed and integrated in arbitrary units according to various loads, use situations, or the like. For example, the sound source separation filter information estimation device 10 and the sound source separation device 20 may be an integrated device. Further, all or some of processing functions performed by the respective devices may be realized by a CPU and a program analyzed and executed by the CPU, or may be realized as hardware by wired logic.

Further, all or some of the processing described as being performed automatically among the respective processing described in the present embodiment can be performed manually, or all or some of the processing described as being performed manually can be performed automatically using a known method. Further, the respective processes described in the present embodiment can not only be executed in chronological order according to the order in the description, but may also be executed in parallel or individually depending on a processing capability of a device that executes the processing or as necessary. In addition, information including the processing procedures, control procedures, specific names, and various types of data or parameters illustrated in the above document or drawings can be arbitrarily changed unless otherwise specified.

Program

Figure 5:
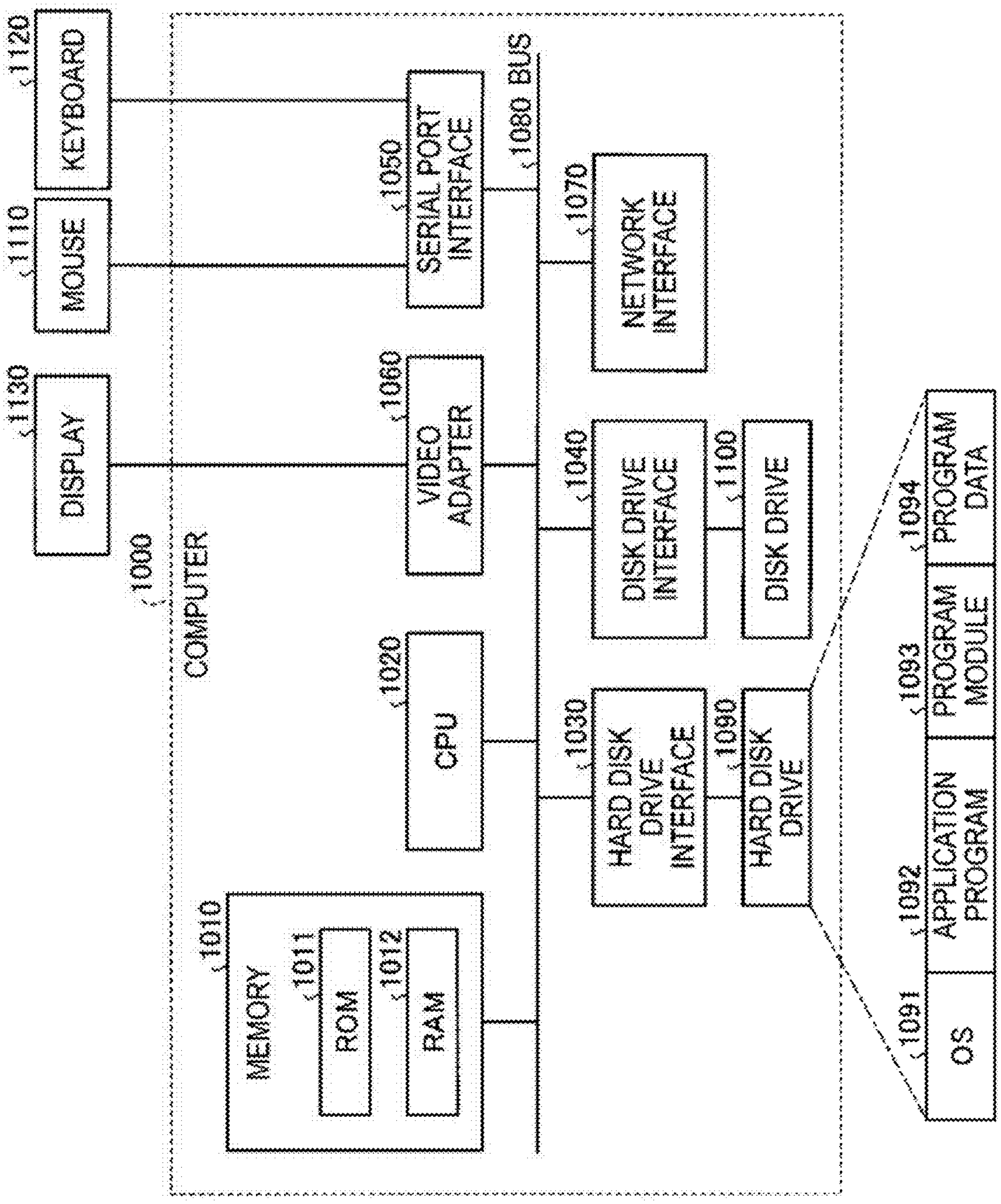
FIG. 5 is a diagram illustrating an example of a computer in which a sound source separation filter information estimation device or a sound source separation device is implemented by a program being executed.

FIG. 5 is a diagram illustrating an example of a computer in which the sound source separation filter information estimation device 10 or the sound source separation device 20 is realized by a program being executed. The computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

Memory 1010 includes a ROM 1011 and a RAM 1012. The ROM 1011 stores, for example, a boot program such as a basic input output system (BIOS). The hard disk drive interface 1030 is connected to a hard disk drive 1031. The disc drive interface 1040 is connected to a disc drive 1041. For example, a removable storage medium such as a magnetic disk or an optical disc is inserted into the disc drive 1041. The serial port interface 1050 is connected to, for example, a mouse 1110 and a keyboard 1120. The video adapter 1060 is connected to, for example, a display 1130.

The hard disk drive 1031 stores, for example, an OS 1091, an application program 1092, a program module 1093, and program data 1094. That is, a program defining each of processing of the sound source separation filter information estimation device 10 and the sound source separation device 20 is implemented by the program module 1093 in which code that can be executed by the computer 1000 is written. The program module 1093 is stored in, for example, the hard disk drive 1031. For example, the program module 1093 for executing the same processing as that of a functional configuration in the sound source separation filter information estimation device 10 or the sound source separation device 20 is stored in the hard disk drive 1031. The hard disk drive 1031 may be replaced with a solid state drive (SSD).

Further, configuration data to be used in the processing of the embodiments described above is stored as the program data 1094 in, for example, the memory 1010 or the hard disk drive 1031. The CPU 1020 reads the program module 1093 or the program data 1094 stored in the memory 1010 or the hard disk drive 1031 into the RAM 1012 as necessary, and executes the program module 1093 or the program data 1094.

The program module 1093 or the program data 1094 is not limited to being stored in the hard disk drive 1031, and may be stored, for example, in a removable storage medium and read by the CPU 1020 via the disc drive 1041 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

The embodiments to which the invention made by the present inventor has been applied have been described above, but the present invention is not limited to the description and the drawings, which form a part of the disclosure of the present invention according to the embodiments. That is, all other embodiments, examples, operation techniques, and the like made by those skilled in the art based on the embodiment are included in the scope of the present invention.

REFERENCE SIGNS LIST

1 Sound source separation system
10 Sound source separation filter information estimation device
11 Initial value setting unit
12 NMF parameter updating unit
13 Simultaneous decorrelation matrix updating unit
14 Iterative control unit
15 Estimation unit
20 Sound source separation device

The invention claimed is:

1. An estimation device, comprising:

a memory; and processing circuitry coupled to the memory and configured to estimate a covariance matrix having information on a correlation between sound source spectra and information on a correlation between channels, separate an individual sound source signal from a mixed acoustic signal using the estimated covariance matrix to implement a sound source separation filter to separate the individual sound source signal, and output the separated individual sound source signal, wherein the processing circuitry estimates the covariance matrix by modeling as many covariance matrices as there are sound sources, and simultaneously diagonalizing the covariance matrices.

2. The estimation device according to claim 1, wherein the processing circuitry estimates the covariance matrix on an assumption that a matrix after simultaneous diagonalization is modeled according to nonnegative matrix factorization.

3. The estimation device according to claim 2, wherein the processing circuitry is configured to perform the nonnegative matrix factorization as an iterative process.

4. The estimation device according to claim 3, wherein the iterative process ends upon satisfaction of a predetermined condition.

5. The estimation device according to claim 4, wherein the predetermined condition includes reaching a predetermined number of iterations.

6. The estimation device according to claim 4, wherein the predetermined condition includes that an amount of updating of a nonnegative matrix factorization parameter is smaller or equal to a predetermined threshold.

7. The estimation device according to claim 1, wherein to estimate the covariance matrix, the processing circuitry is configured to:

perform an independent low-rank matrix analysis (ILRMA) on the mixed acoustic signal based on frequency correlation, perform the ILRMA on the mixed acoustic signal based on time correlation, and perform the ILRMA on the mixed acoustic signal based on both frequency correlation and time correlation.

8. The estimation device according to claim 7, wherein the processing circuitry is configured to use any one of the ILRMA based on frequency correlation, the ILRMA based on time correlation, and the ILRMA based orr both frequency correlation and time correlation to estimate the covariance matrix.

9. The estimation device according to claim 8, wherein the acoustic signal includes vocals.

10. A non-transitory computer readable medium including an estimation program for causing a computer to perform a method comprising:

estimating a covariance matrix having information on a correlation between sound source spectra and information on a correlation between channels;

separating an individual sound source signal from a mixed acoustic signal using the estimated covariance matrix to implement a sound source separation filter o separate the individual sound source signal; and outputting the separated individual sound source signal, wherein the covariance matrix is estimated by modeling as many covariance matrices as there are sound sources, and simultaneously diagonalizing the covariance matrices.

11. The non-transitory computer-readable medium according to claim 10, wherein to estimate the covariance matrix, the method further comprises:

performing an independent low-rank matrix analysis (ILRMA) on the mixed acoustic signal based on frequency correlation, performing the ILRMA on the mixed acoustic signal based on time correlation, and performing the ILRMA on the mixed acoustic signal based on both frequency correlation and time correlation.

12. The non-transitory computer-readable medium according to claim 11, further comprising using any one of the ILRMA based on frequency correlation, the ILRMA based on time correlation, and the ILRMA based on both frequency correlation and time correlation to estimate the covariance matrix.

13. The non-transitory computer-readable medium according to claim 10, wherein the acoustic signal includes vocals.

14. An estimation method, comprising:

estimating a covariance matrix having information on a correlation between sound source spectra and information on a correlation between channels;

separating an individual sound source signal from a mixed acoustic signal using the estimated covariance matrix to implement a sound source separation filter o separate the individual sound source signal; and outputting the separated individual sound source signal, wherein the covariance matrix is estimated by modeling as many covariance matrices as there are sound sources, and simultaneously diagonalizing the covariance matrices.

15. The estimation method according to claim 14, wherein to estimate the covariance matrix, the method further comprises:

performing an independent low-rank matrix analysis (ILRMA) on the mixed acoustic signal based on frequency correlation, performing the ILRMA on the mixed acoustic signal based on time correlation, and performing the ILRMA on the mixed acoustic signal based on both frequency correlation and time correlation.

16. The estimation method according to claim 15, further comprising using any one of the ILRMA based on frequency correlation, the ILRMA based on time correlation, and the ILRMA based on both frequency correlation and time correlation to estimate the covariance matrix.

17. The estimation method according to claim 16, wherein the acoustic signal includes vocals.

* * * * *